F. H. FISHER.

Hydraulic Mining Apparatus.

No. 5,193. Reissued Dec. 17, 1872.

Witnesses:

A. Bennewendorf

L. S. Maber

Inventor:

F. H. Fisher per Munn & Co

Attorneys.

AM. PHOTO-LITHOGRAPHIC CO. N.Y. (OSBORNE'S PROCESS.)

UNITED STATES PATENT OFFICE.

FRANK H. FISHER, OF NEVADA CITY, CALIFORNIA.

IMPROVEMENT IN HYDRAULIC MINING APPARATUS.

Specification forming part of Letters Patent No. 110,222, dated December 20, 1870; reissue No. 5,193, dated December 17, 1872.

*To all whom it may concern:*

Be it known that I, FRANK H. FISHER, of Nevada City, Nevada county, State of California, have invented an Improvement in Hydraulic Mining Apparatus; and I do hereby declare the following description and accompanying drawing are sufficient to enable any person skilled in the art or science to which it most nearly appertains to make and use my said invention without further invention or experiment.

My invention relates to an improved construction and arrangement of that class of hydraulic pipes and nozzles which are used for directing and delivering a stream or column of water against a bank in hydraulic mining. My improvement consists in such an arrangement of the pipe and nozzle that the nozzle can have both horizontal and vertical play through the medium of two moving water-tight joints for the purpose of facing it to any desired point of the compass without shutting off the water or stopping the work of the machine.

Figure 2:
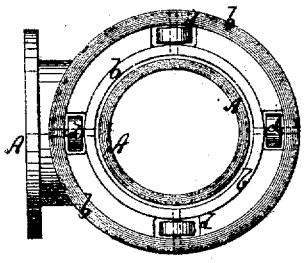
Figure 1:
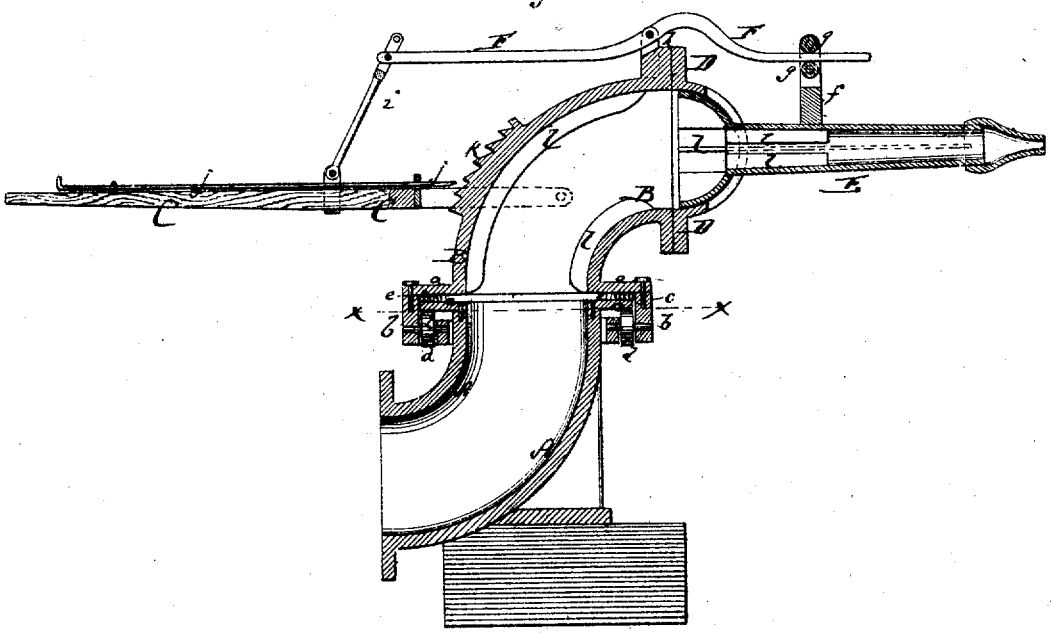
Figure 3:
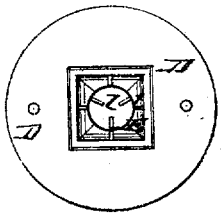
Figure 4:
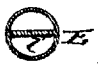

In the accompanying drawing, Figure 1 is a longitudinal section of my improxed mining apparatus; Fig. 2 is a horizontal section of the same taken on the plane of the line *x x*, Fig. 1; Fig. 3 is an inner view of the discharge-nozzle; and Fig. 4 is a transverse section of a part of the same.

The same letters of reference in the drawing indicate the same parts.

A represents the outer end section of the pipe through which water is forced by its own pressure when conducted from higher points, or by a steam-pump or other forcing apparatus. This section A I bend upward in the form of an elbow, as shown at Fig. 1. To the upper end of this section or elbow I connect one end of another elbow, B, by means of a swivel connection or joint formed by the two horizontal flanges *a c* on the outer meeting-edges of the sections. These flanges are placed together and held in place by a ring, *b*, which carries friction-rollers *d d* that fit and bear against the under side of the lower flange. Packing *e* is interposed between the flanges *a c*, as shown. The elbow B, to which is pivoted a handle, C, can thus be freely turned on the elbow A, and will still always form a water-tight joint. To the outer end of the elbow B is screwed a plate, D, which has semicircular projecting ears and flanges on the same to receive the semi-cylindrical end or ball-joint of the discharge-pipe E. The pipe E, carrying the nozzle, has a projecting slotted post, *f*, which has friction-rollers *g g* that work above and below a lever, F, passing between them. The lever F is pivoted to a post, *h*, that projects from the elbow B, and is connected with the lever C by a rod, *i*, while its front end passes through the slotted post *f*, as shown. The ball-and-socket joint formed by the discharge-pipe E on the elbow B permits the same to be swung up or down at will, while it can be swung horizontally with the elbow B. All the motions can be executed by means of the handle C, which is pivoted to swing up or down. It may be provided with a pawl or slide, *j*, to lock into a rack or toothed projection, K, of the elbow B, for the purpose of securing the nozzle at any desired elevation. The pressure of the water holds the ball-joint closed and water-tight. The discharge-pipe, as well as the swivel-elbow, may have inner ribs or partitions *l* for guiding the water straight forward. By this arrangement the nozzle or discharge-pipe E can be raised or lowered or turned horizontally to any desired position while working.

Heretofore this class of machines have been made with single joints, so that the discharge-pipe will command only the half of a circle; but by using the two joints I can swivel the nozzle around to any point of the compass, and then command the same amount of circle with the nozzle as the ordinary ball-and-socket joint.

I am aware that a discharge-nozzle has been heretofore used by Jenkin W. Richards, of Michigan Bluffs, California, in which two joints were made for the purpose of throwing the stream in a circle, but his nozzle proved to be a failure when subjected to the practical test of hydraulic mining.

Having thus described my invention, what I claim, and desire to secure by Letters Patent, is—

1. The swivel-jointed nozzle and pipes A B

D E combined, as described, with the lever F working through slotted posts *f*, strap *i*, lever *c*, and pawl and ratchet *j* K, for the purpose specified.

2. The two curved sections A B, connected by a horizontal swivel-joint, in combination with a nozzle, connected by a semi-universal joint, constructed and arranged substantially as set forth.

3. The levers C and F in combination with the section B and nozzle E, substantially as set forth.

In witness whereof I hereunto set my hand and seal.

FRANK H. FISHER. [L. S.]

Witnesses:

THALES CURTIS,
HARMON A. LORD.